June 4, 1935. I. HECHENBLEIKNER ET AL 2,003,442
MANUFACTURE OF SULPHURIC ACID FROM HYDROGEN SULPHIDE GAS
Filed March 7, 1932
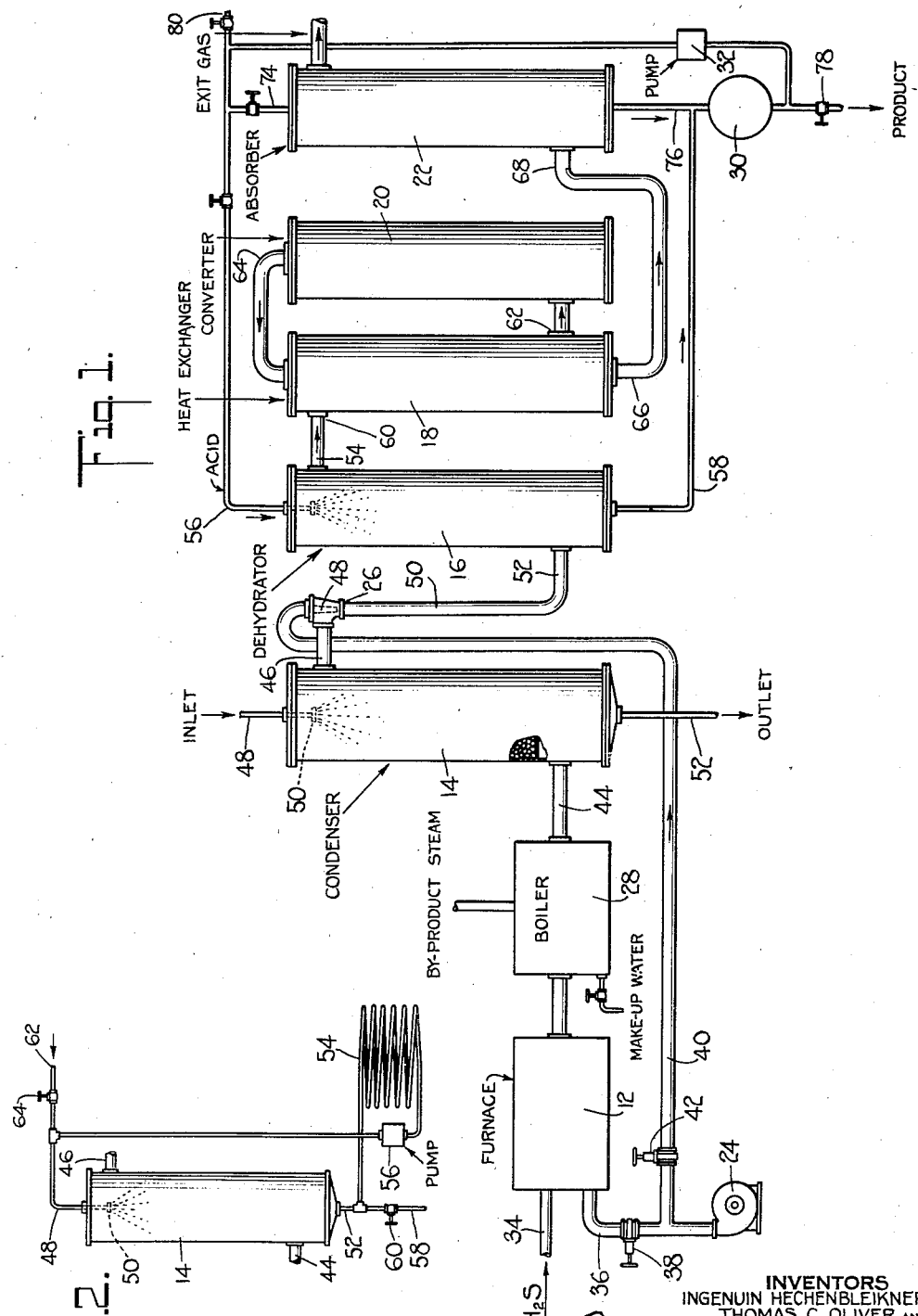
INVENTORS
INGENUIN HECHENBLEIKNER,
THOMAS C. OLIVER AND
BY SAMUEL F. SPANGLER
ATTORNEYS Patented June 4, 1935

2,003,442

UNITED STATES PATENT OFFICE 2,003,442

MANUFACTURE OF SULPHURIC ACID FROM HYDROGEN SULPHIDE GAS

Ingenuin Hechenbleikner, Charlotte, N. C., and Thomas C. Oliver, Great Neck, and Samuel F. Spangler, Flushing, N. Y., assignors to Chemical Construction Corporation, Charlotte, N. C., a corporation of Delaware Application March 7, 1932, Serial No. 597,180

16 Claims. (Cl. 23—175)

This invention relates to the manufacture of sulphuric acid, especially the manufacture of strong sulphuric acid by the contact process, and more particularly to such a process designed to utilize by-product hydrogen sulphide gas.

Hydrogen sulphide gas is obtained in large quantities as a by-product in commercial processes such as oil refining. This gas may be readily concentrated to high values, say, 85 to 100% purity by known processes which, however, form no part of the present invention. In spite of the wide prevalence of the hydrogen sulphide as a cheap by-product, and in spite of the fact that it has long been known on theoretical grounds that this gas may be burned preparatory to the manufacture of sulphuric acid, no such process has gone into successful commercial use, except possibly for the production of weak sulphuric acid by the chamber process. The primary and general object of the present invention resides in the provision of a method which will make possible the successful production and manufacture of highly concentrated sulphuric acid by the contact process directly from the combustion of hydrogen sulphide gas; and correlated objects are to thereby dispense with the necessity of using a separate concentrating plant, and to obtain all of the known advantages of the contact process compared with the chamber process.

More specifically, one of the objects of the present invention is to control and, more preferably, to completely eliminate the formation of sulphur trioxide when burning the hydrogen sulphide gas, for this automatically obviates many difficult problems centering largely about the undesired production of $SO_3$ mist. This object, we have found, may be accomplished by precautionary measures including the use of a high combustion temperature and a limited quantity of oxygen or air. The necessary high temperature is obtained, first, by using concentrated hydrogen sulphide gas; and secondly, by limiting the quantity of air supplied to the furnace, for this air is mostly inert gas and in any case must be heated to the furnace temperature. The consequent avoidance of unnecessary excess air with its cooling effect on the furnace temperature, is anyway exceedingly desirable, for excess oxygen in itself has a direct effect on the production of the higher oxide $SO_3$. The combustion of hydrogen sulphide involves, of course, the burning of hydrogen, and this evolves considerable heat, which in turn facilitates obtaining the desired high furnace temperature.

The combustion gas is heavily moisture laden as a result of the burning of hydrogen, and, as will be later explained in detail, the present process involves what we term "cold purification", that is, the combustion gas is cooled to approximately atmospheric temperature, thereby precipitating and condensing the bulk of the moisture content in the gas, after which excess air may be added to the $SO_2$ gas and the mixture dehydrated and finally catalytically converted to the desired sulphuric anhydride. In accordance with a further object and feature of the present invention, the combustion gas after leaving the furnace, may be partially cooled by utilizing the same to produce by-product steam; and this steam may be applied to any useful purpose, such, for example, as the operation of the various fans and pumps used in the present system or apparatus, thus making the same self-contained as regards power consumption. If there is no use for the steam, the boiler may be entirely omitted, for the direct contact condenser subsequently described is sufficient to cool the combustion gases.

A further object of the present invention is to reduce the necessary size and cost of cooling or condenser equipment needed for the cold purification process, and at the same time to improve the efficiency and ease of removal of the moisture content. This object may be accomplished largely by dividing or splitting the air or oxygen supply needed in the process, so that instead of feeding the entire air supply to the furnace, a part of the air supply is fed into the system following the condenser used for moisture removal. This auxiliary air supply, instead of being limited, is preferably made in excess and is proportioned for optimum results when catalytically converting the sulphur dioxide gas to sulphuric anhydride. In consequence of this arrangement, the volume of gas which must be passed through the cooling or condensing equipment is greatly reduced, which in turn reduces the size and operating cost of this equipment. Incidentally, this feature of the invention ties up in an advantageous and consistent manner with the desirability of limiting the air supplied to the furnace, in order to prevent the formation of $SO_3$. The cold purification of the combustion gas includes not only cooling and condensation, but preferably also includes a subsequent dehydration, as by means of sulphuric acid. In accordance with a further object and feature of the present invention, the auxiliary air supply is fed into the system between the condenser and the dehydrator, thus permitting the dehydrator to remove the moisture content in the secondary air supply.

Still another object of the present invention resides in the provision of an improved form of cooler and condenser for the cold purification step heretofore explained. More specifically, some of the objects of the invention considered in this aspect are to overcome the difficulties of ordinary tube condensers, such as the susceptibility to acid attack and consequent deterioration, and the deposit of impurities on the tube walls with consequent reduced heat transfer. We find it advantageous and desirable to use direct instead of indirect cooling of the combustion gas, that is, we bring the combustion gas into direct contact with the cooling water, as by means of a heavy water spray in a packed tower. The temperature of the cooling water is preferably controlled within limits avoiding vaporization of the water, on the one hand, and absorption of $SO_2$ on the other hand. As will be explained later in detail, the condensing equipment may be varied to meet specific conditions, such as a scarcity or a plentitude of cooling water.

With such a direct contact cooling condenser, the gas leaving the condenser tends to be saturated. Of course the moisture content is quite low and has been enormously decreased because the temperature of the gas, instead of being over 2000° F., will only be, say, 100° F. The saturated gas is led from the condenser to a dehydrator, but this is preferably located near the converter and sulphuric acid equipment, rather than near the furnace and condenser equipment, and consequently there may be a long pipe line between the condenser and the dehydrator, in which pipe line the moisture may tend to precipitate, with consequent attack on the pipe. To avoid this, we have found it desirable to connect the secondary air supply immediately following the condenser, so that this newly added air, which is almost never saturated, tends to take up and keep in suspension the moisture content of the $SO_2$ gas.

Further objects of the present invention are to reduce the size of the apparatus units needed for practicing the invention; to increase the efficiency of the process as a whole; and to avoid acid attack and deterioration of blowers or like equipment needed to keep up the gas circulation. With this in view, we find it desirable to operate the system under a positive, rather than a negative pressure, and to obtain the desired pressure or forced draught by means of a blower operating only upon ordinary air prior to its admixture with $H_2S$ in the furnace, or with $SO_2$ in the dehydrator and converter.

To the accomplishment of the foregoing and such other objects as may hereinafter appear, our invention consists in the method steps and their relation one to the other, as hereinafter are more particularly described in the specification and sought to be defined in the claims. The specification is accompanied by a drawing, in which:

Fig. 1 is a flow diagram explanatory of the invention; and

Fig. 2 shows a modified form of condenser for use in the system of Fig. 1.

Referring to the drawing and particularly to Fig. 1 thereof our invention may be practiced by burning the hydrogen sulphide gas with air in a furnace 12, thereby producing $SO_2$ and moisture. The combustion gas is supplied to a condenser 14 in which the gas is cooled and the moisture content condensed and substantially eliminated. The cooled combustion gas has secondary air or oxygen added thereto, and the mixture is preferably passed through a dehydrator 16 in order to remove any remaining traces of moisture. The dry gas mixture may then be reheated in a heat exchanger 18 and supplied to a catalytic converter 20. The exit gases from the converter may be cooled in heat exchanger 18, after which they are fed to any appropriate form of absorber 22. Primary and secondary air may be supplied under forced draught from a blower 24 connected to furnace 12, and also between condenser 14 and dehydrator 16 preferably at point 26 immediately following condenser 14. Waste heat or by-product steam boiler 28, may, if desired, be located between furnace 12 and condenser 14, in order to partially cool the combustion gas and at the same time to take advantage of the large heat content thereof. Absorber 22 may have a supply of preferably 98% sulphuric acid 30 continuously circulated therethrough by a pump 32, the acid being maintained at that desired strength by absorption of the anhydride gas. A portion of the circulating acid may be connected in parallel, as shown, to the dehydrator 16.

The hydrogen sulphide gas may be obtained from any suitable source, and ordinarily is obtained as a by-product of commercial plants such as coke plants and oil refineries. This gas is preferably preliminarily concentrated from an initial strength of, say, only 3 to 10%, to a final strength which is very high, say, 85 to 100%. The balance will ordinarily be $CO_2$ or other gases which do not injuriously affect the operation of the process. This desirable concentration of the $H_2S$ may be accomplished by absorption and subsequent evolution from a fluid, such process forming in itself no part of the present invention and therefore not being described in detail. The $H_2S$ gas is supplied through a pipe 34 to furnace 12 where it is mixed with air supplied through a pipe 36 from blower 24. The air supplied to the furnace may be regulated by a valve 38 and is preferably limited to the minimum value which will successfully insure combustion of the hydrogen to $H_2O$ and combustion of the sulphur to $SO_2$. No air is provided at this point for subsequent oxidation of the $SO_2$ gas to sulphuric anhydride, because air for this purpose is separately supplied through conduit 40 under the control of valve 42.

The hydrogen sulphide gas burns freely immediately upon ignition by any temporary flame or pilot light, and therefore no means for external heating or preheating, or other complication, is needed for the furnace 12. The furnace chamber is designed to withstand an exceedingly high temperature, for the temperature therein is preferably kept above 2000° F. A high operating temperature is exceedingly desirable in order to substantially prevent the formation of $SO_3$ in the furnace. The necessary high operating temperature is readily obtained because of the preferably rich hydrogen sulphide gas used, and because of the limited quantity of air supplied to the furnace, for air over and above that needed for combustion acts as a cooling medium. At the same time, restriction of excess air at this point in itself tends to inhibit formation of the higher oxide of sulphur. The furnace temperature may, of course, be run up to a value considerably higher than 2000° F., this figure being considered a minimum.

The gaseous combustion products from furnace 12 must be cooled practically to atmospheric temperature, and this requires considerable cooling equipment and is wasteful of heat. Some of this heat may, if desired, be utilized by passing the combustion gases through a by-product steam boiler, indicated generally at 28. The steam generated in this boiler may be used for any desired purpose, and even within the system here shown, may be used to drive fan 24, pump 32, and other power equipment needed in practice. With such an arrangement, the system requires no power consumption from outside sources.

From boiler 28, the partially cooled combustion gases are supplied to condenser 14. This may be a tube condenser of ordinary type, but such a condenser possesses manifest disadvantages, such as the fact that the metal is subject to attack, and the tubes become coated with a deposit of impurities, thereby greatly reducing the heat transfer efficiency. We find that far superior results may be obtained for this purpose by condensing the moisture content in the combustion gas by contacting it directly with water. Paradoxical though this sounds, it works out well in practice because the moisture content, resulting, for the most part, from the combustion of the hydrogen in the hydrogen sulphide gas, and carried in the combustion gas, is extremely great and is being carried at a very high temperature. The direct contact type of condenser permits the gas leaving the condenser to be saturated with moisture, but the gas meanwhile is cooled down to substantially atmospheric temperature below, say, 100° F., and consequently the moisture content is exceedingly small when compared with the enormous moisture content entering the condenser. The direct contact type of condenser, we find, is more efficient not only for cooling the combustion gases, but also for washing the gases and removing dust and minor hydrocarbon products, and the like.

The condenser here shown is of the tower type, and comprises simply a packed tower over which a heavy water spray is permitted to fall. The combustion gas enters through pipe 44 at the bottom of the tower, and leaves through pipe 46 at the top of the tower. Water is fed through inlet pipe 48 to a spray head 50, and is drained by outlet pipe 52. If water is plentiful, fresh water may be run continuously through pipe 48 and discharged into a sewer from pipe 52. In such case, however, the condenser should not be run cold, but instead the water supply should be so regulated that upon discharge it will have a temperature of from, say, 85 to 100° F. The temperature should preferably be above 85° F. in order to prevent appreciable absorption of $SO_2$ gas. The temperature should preferably be below 100° F. in order to prevent appreciable vaporization of $H_2O$, that is, in order to reduce the moisture content of the gas leaving the condenser.

If water is scarce, it may be continuously circulated through the condenser. An arrangement of this type is schematically illustrated in Fig. 2, in which condenser tower 14 corresponds to condenser 14 in Fig. 1, as do the elements 44, 46, 48, 50, and 52. In this case, however, the water drained from pipe 52, instead of being discharged to a sewer, is circulated through air cooled coils 54 and then pumped upwardly by means of a pump 56 to the inlet pipe 48. In order to prevent excessive pollution of the condenser water, the water is gradually changed by permitting a slow continuous or intermittent discharge through pipe 58 under the control of a valve 60, while fresh make-up water is admitted through pipe 62 under the control of a valve 64. The water removed from the system is preferably removed at the hottest point in the system, which, in this case, is at the bottom of the condenser and ahead of the cooling coils 54, as is shown in Fig. 2. This removal at high temperature prevents the water from carrying appreciable quantities of $SO_2$ gas in solution. Of course, with a circulating system such as is shown in Fig. 2, the opportunity for removal of $SO_2$ gas is inherently minimized, and the condenser may therefore be operated at a lower temperature than that recommended in the case of the condenser in Fig 1. In Fig. 2, for example, the water may be discharged at a temperature of, say, 75 to 85° F., without resulting in appreciable loss of $SO_2$ gas. This at the same time further reduces the water content in the combustion gas leaving the condenser.

It will be understood that the air cooled coils 54 may be replaced by open spray nozzles. It should further be understood that a circulating system such as is shown in Fig. 2 may, if desired, be employed even when cooling water is plentiful, for in such case the cooling water may be used to cool the circulating water in the condenser, while the use of circulating water in itself possesses the advantages already pointed out, such as reduction in loss of $SO_2$ gas and permissible lowering of the moisture content of the combustion gas. It should also be understood that the direct contact between the cooling water and the combustion gas here recommended, need not necessarily be obtained in a packed tower, but may, for example, be obtained by bubbling gas through liquid in a drum system, such as is disclosed in copending application of Ingenuin Hechenbleikner, Serial No. 513,091, filed February 3, 1931. When using a drum system such as is there disclosed, the various determining factors heretofore discussed, such as the prevalence or scarcity of ample cooling water, may be applied substantially in the manner already recommended.

The cooled combustion gas leaves condenser 14 through pipe 46, and is immediately joined by the secondary combustion air supplied directly from blower 24 through pipe 40. The secondary air is preferably directed into a nozzle 48 at the point 26, so as to obtain some Venturi action, which helps maintain the circulation of gas through pipe 46, instead of opposing the same. The secondary air supplied at this point is not limited, and preferably is supplied in considerable excess. Specifically, we recommend a ratio in the mixed gases of approximately 1.4 parts of oxygen to 1 part of $SO_2$ gas. In practice, of course, the actual gas volume ratios will depend upon the gas concentration, but the oxygen to sulphur dioxide ratio may always be referred to as a standard. The preferred ratio of 1.4 may, of course, be varied, say, from 1.3 to 1.6, and is of importance in obtaining optimum efficiency of operation of the catalytic converter 20 subsequently traversed by the gases, all as is explained in greater detail in copending application of Ingenuin Hechenbleikner, Serial No. 575,549, filed November 17, 1931.

The point of junction 26 of the secondary air supply is kept as near as possible to the outlet from condenser 14 because the gas leaving the condenser is saturated and will keep pipe 46, leading to dehydrator 16, in a wet condition, thereby leading to attack on the metal. Inasmuch as pipe 50 may, in some installations, be exceedingly long, dehydrator 16 being associated with the converter and acid apparatus, the precaution here recommended is of value because it prevents liquefication of moisture or wetting of the pipe 50, and thus prevents attack on the material thereof.

Dehydrator 16 may consist of a packed tower, like condenser 14, through which the gas mixture flows upwardly from inlet 52 to outlet 54. A stream of sulphuric acid is sprayed downwardly from pipe 56 over the packing to drain pipe 58. Dehydrator 16 serves to remove the last traces of water from the combustion gas discharged from condenser 14. At the same time, as a result of connecting the secondary air supply between condenser 14 and dehydrator 16, the secondary air supply is itself dehydrated and completely dried. It should be understood that while dehydrator 16 has been shown in the form of a tower, it may also take the form of the drum system disclosed in the copending application previously referred to.

It may also be mentioned at this point that while it is highly preferable to use cold purification apparatus in the form of two parts, namely,—a condenser 14 for removing the bulk of the moisture, and a dehydrator 16 for removing traces of moisture, this is not essential, and instead a single unit may be used, which preferably takes the form of dehydrator 16, that is to say, the cooling fluid is preferably sulphuric acid, rather than water. This will dilute the acid passed through the dehydrator, and therefore such an arrangement should only be used in a case where it is anyway desired to produce dilute, rather than concentrated acid. On the other hand, it may also be pointed out that while only a single dehydrator 16 has been shown, in practice any number of dehydrators may be used in order to obtain more perfect drying of the gases.

From dehydrator 16 the dried gas mixture flows through a heat exchanger 18, entering at 60 and leaving at 62. This reheats the gas mixture from an exceedingly low temperature, which is substantially atmospheric temperature, to a temperature of, say, 800° F. suitable for best results in catalytic converter 20 into which the preheated gas mixture is next supplied. Catalytic converter 20 may use a platinum catalyst if the gas mixture supplied thereto is quite pure, but ordinarily preferably employs a vanadium catalyst mixture because vanadium is not readily poisoned by impurities, as is platinum. The converter 20 raises the sulphur dioxide to the trioxide, and the resulting gas mixture flows from converter outlet 64 to the heat exchanger 18 where the gases are cooled preparatory to absorption. The cooled anhydride gas leaves the heat exchanger 18 through a discharge pipe 66, and is then guided to absorber 22. The absorber is shown in the form of a packed tower similar to towers 14 and 16. The gas flows upwardly in the tower from inlet 68 to outlet 70 which may, if desired, be provided with mechanism for maintaining any desired slight back pressure on the system. Sulphuric acid is circulated downwardly through an inlet pipe 74 and is collected by a drain pipe 76 leading to a drum or tank 30 from which the acid is again pumped upwardly by pump 32 and thus circulated continuously through the absorption tower. The acid is preferably about 98% in strength, for most efficient absorption, and is kept at that concentration by absorption of the anhydride gas during removal of the product acid through discharge pipe 78, the product acid being removed either as a continuous trickle or in batches. Fuming sulphuric acid may be made by cascaded counterflow absorption, the 98% acid going from the absorber shown to a second absorber, and the latter absorber receiving the anhydride gas first and then discharging the same to the first absorber.

It should be understood that while one absorber 22 is shown, a plurality of such units may be employed. It should further be understood that instead of the tower here shown, a drum absorber may be used, such as is shown in the copending application heretofore referred to. It may also be observed that in the present case a single pump 32 circulates acid in dehydrator 16 as well as in absorber 22, but, if desired, separate tanks of sulphuric acid may be separately circulated through the dehydrator and the absorber. When hydrogen sulphide is burned, the water produced is theoretically correct in amount for the production of sulphuric acid of 100% strength. Inasmuch as a large proportion of the original moisture is removed by the condenser, the arrangement here shown, in which the dehydrator moisture is added to the product acid, may result in sulphuric acid of even greater than 100% strength, and this is true despite the moisture content of the primary and secondary air supply. Viewed differently, if, as is ordinarily the case, it is desired to produce 98% sulphuric acid, it will be necessary to add some make-up water, as at 80, to the circulating system of the absorber and the dehydrator, even though the large quantity of moisture removed by the dehydrator is being added to the product acid. From the foregoing remarks, it will be obvious that changes in the circulation system of the dehydrator and the absorber, as well as in the use or amount of make-up water added, etc., may and in practice will be made in accordance with the particular kind of product desired.

It has already been pointed out that the primary air supply is preferably limited with a view to inhibiting the direct formation of sulphur trioxide. Theoretically, one volume of $H_2S$ requires one and a half volumes of oxygen or about 7.2 volumes of air for complete combustion. This theoretically results in an $SO_2$ gas of some 15% strength leaving the furnace. In actual practice, this percentage of $SO_2$ in the combustion gases may be of the order of only 12½ or 13% because of the addition of a slight excess of air, say, 10% equivalent to the use of about eight volumes of air to one volume of $H_2S$; because the $H_2S$ need not and ordinarily will not be 100% pure; and because the combustion in the furnace may fall slightly short of complete. The temperature in the furnace will ordinarily range between 2000 and 3000° F. The percentage of $SO_2$ in the gases entering the converter should preferably be about 7½% and ought never to be weaker than 5%. This desirable strength of $SO_2$ gas will, we find, be obtained when adding secondary air for the ratio previously prescribed, that is, say, 1.4 volumes of oxygen to 1 volume of $SO_2$ gas in the mixed gases.

It is believed that the method of practicing our improved process for manufacturing sulphuric acid, and the many advantages thereof, will, for the most part, be apparent from the foregoing detailed description. The process makes it possible to manufacture strong or fuming sulphuric acid by the contact process directly from hydrogen sulphide gas. The combustion of the gas is so controlled as to prevent the formation of sulphur trioxide, and the necessary temperature and air supply conditions are readily obtained and are in themselves advantageously related to the operation of the remainder of the system. Any desired strength of hydrogen sulphide gas, and particularly gas of nearly or entirely full strength may be efficiently utilized. The process involves cold purification of the combustion gases, and the desired purification is preferably obtained in a condenser stage and a dehydration stage. The condenser equipment may be reduced in size and simplified by reason of subdividing the necessary air supply into primary and secondary portions. If desired, a by-product steam boiler may be inserted to utilize waste heat and increase the over-all efficiency of the plant. The dehydrator for the combustion gas may also be used to dehydrate the secondary air, and the latter is so connected into the system that liquefication and attack on the apparatus by acid is minimized. The condenser preferably uses direct water contact which avoids attack and deterioration of metal parts, and further avoids deposits of impurities with consequent reduced heat transfer, as well as increases the cooling efficiency and introduces a washing and cleaning function for the condenser. The cooling efficiency for this type of equipment is good enough to permit complete cooling of the high temperature combustion gases without the use of a by-product steam boiler, while employing relatively simplified condenser equipment. The temperature of the circulating water in the condenser is carefully regulated within limits designed, on the one hand, to prevent absorption of $SO_2$ gas, and designed, on the other hand, to prevent undue vaporization of water. The condenser system may be altered to accommodate conditions of scarcity or plentitude of cooling water. The entire system may be operated under a positive pressure, and this in turn is preferably produced by a forced draught of air the arrangement being such that the blower handles only air and therefore is not itself subject to chemical attack. As a result of the process, an otherwise wasted by-product, hydrogen sulphide gas, may be successfully used for the manufacture of highly concentrated sulphuric acid.

It will be apparent that while we have shown and described the method of our invention in preferred form, many changes and modifications may be made in the method steps and their mutual interrelation, without departing from the spirit of the invention, defined in the following claims.

We claim:

1. In the manufacture of sulphuric acid by the contact process, the method which includes burning highly concentrated $H_2S$ gas in a limited air supply, subjecting the combustion gas to cold purification, adding oxygen thereto, and producing sulphuric anhydride by catalytic conversion of the resulting gas mixture.

2. In the manufacture of sulphuric acid by the contact process, the method which includes burning highly concentrated $H_2S$ gas in a limited air supply just sufficient for the oxidation of the hydrogen to $H_2O$ and the sulphur to $SO_2$, adding excess oxygen to the $SO_2$ gas in the ratio of approximately 1.4 to 1, removing the water formed and producing sulphuric anhydride by catalytic conversion of the resulting gas mixture.

3. In the manufacture of sulphuric acid by the contact process, the method which includes burning approximately 90% $H_2S$ gas at a temperature above 2000° F. to produce $SO_2$ gas and moisture, subjecting the combustion product to cold purification to remove the moisture, adding excess air to the $SO_2$ gas, and producing sulphuric anhydride by catalytic conversion of the resulting gas mixture.

4. In the manufacture of sulphuric acid by the contact process, the method which includes burning highly concentrated $H_2S$ gas in a limited air supply just sufficient for the oxidation of the hydrogen and sulphur in the $H_2S$ gas, the lack of excess air resulting in a high combustion temperature and both of these factors contributing to the absence of $SO_3$ while producing the desired $SO_2$ gas, subjecting the gas to cold purification to eliminate moisture, adding excess air thereto, and producing sulphuric anhydride by catalytic conversion of the resulting gas mixture.

5. In the manufacture of sulphuric acid by the contact process, the method which includes burning highly concentrated $H_2S$ gas in a limited air supply at a very high temperature, partially cooling the combustion gas by the production of by-product steam, further cooling the combustion gas to eliminate moisture, adding air to the $SO_2$ gas, and producing sulphuric anhydride by catalytic conversion of the resulting gas mixture.

6. In the manufacture of sulphuric acid by the contact process, the method which includes burning $H_2S$ to produce moisture laden $SO_2$, exposing the moisture laden $SO_2$ to a direct water spray in order to condense and remove the moisture content in the combustion gas, the condensing water being kept within temperature limits selected, on the one hand, to prevent vaporization of water, and, on the other hand, to prevent appreciable absorption of $SO_2$ in the water, and adding air to the $SO_2$ gas preparatory to catalytic conversion.

7. In the manufacture of sulphuric acid by the contact process, the method which includes burning $H_2S$ to produce moisture laden $SO_2$, condensing and removing the moisture content in the combustion gas, adding air to the $SO_2$ gas immediately adjacent the outlet of the condenser in order to avoid condensation of the saturated gas leaving the condenser, and dehydrating the gas mixture to remove residual traces of water preparatory to catalytic conversion.

8. In the manufacture of sulphuric acid by the contact process, the method which includes burning $H_2S$ to produce moisture laden $SO_2$, directly contacting the moisture laden $SO_2$ with water in order to condense and remove the moisture content in the combustion gas, the cooling water being kept within temperature limits intended, on the one hand, to prevent vaporization of water, and, on the other hand, to prevent appreciable absorption of $SO_2$ in the water, adding air to the cooled $SO_2$ gas, and dehydrating the gas mixture to remove residual traces of water preparatory to catalytic conversion.

9. In the manufacture of sulphuric acid by the contact process, the method which includes burning $H_2S$ to produce moisture laden $SO_2$, directly contacting the moisture laden $SO_2$ with water in order to condense and remove the moisture content in the combustion gas, the cooling water being kept within a temperature limit of from 75 to 100° F., adding air ot the cooled $SO_2$ gas, and dehydrating the gas mixture to remove residual traces of water.

10. In the manufacture of sulphuric acid by the contact process, the method which includes burning H2S to produce moisture laden SO2, exposing the moisture laden SO2 to a direct water spray in order to condense and remove the moisture content in the combustion gas, the condensing water being kept within temperature limits selected, on the one hand, to prevent vaporization of water, and, on the other hand, to prevent appreciable absorption of SO2 in the water, adding air to the SO2 gas immediately adjacent the outlet of the condenser in order to avoid condensation of the saturated gas leaving the condenser, and dehydrating the gas mixture to remove residual traces of water preparatory to catalytic conversion.

11. In the manufacture of sulphuric acid by the contact process, the method which includes burning highly concentrated H2S gas in a limited air supply at a high temperature, condensing and removing the moisture content in the combustion gas, adding air to the SO2 gas, dehydrating the gas mixture to remove residual traces of water, catalytically converting the gas mixture to produce sulphuric anhydride, and absorbing the sulphuric anhydride.

12. In the manufacture of sulphuric acid by the contact process, the method which includes burning highly concentrated H2S gas in a limited air supply at a very high temperature, directly contacting the moisture laden SO2 with water in order to condense and remove the moisture content in the combustion gas, adding air to the SO2 gas, dehydrating the gas mixture to remove residual traces of water, catalytically converting the gas mixture to produce sulphuric anhydride, the entrant and discharge gases from the converter being brought into heat exchange relation, and absorbing the sulphuric anhydride.

13. The method of claim 12, in which the air supply for the combustion of the H2S gas and the air supply for the conversion of the SO2 gas is under forced draught, so that the method is practiced under positive pressure.

14. In the manufacture of sulphuric acid by the contact process, the method which includes burning highly concentrated H2S gas in a limited air supply just sufficient for the primary oxidation of the hydrogen and sulphur in the H2S gas, the lack of excess air resulting in a high combustion temperature and both of these factors contributing to the absence of SO3 while producing the desired SO2 gas, condensing and removing the moisture content in the combustion gas, adding air to the SO2 gas, dehydrating the gas mixture to remove residual traces of water, catalytically converting the gas mixture to produce sulphuric anhydride, and absorbing the sulphuric anhydride.

15. In the manufacture of sulphuric acid by the contact process, the method which includes burning H2S gas in a limited air supply, contacting the moisture laden SO2 with water in order to condense and remove the moisture content in the combustion gas, the condensing water being kept within temperature limits intended, on the one hand, to prevent vaporization of water, and, on the other hand, to prevent appreciable absorption of SO2 in the water, adding air to the SO2 gas immediately adjacent the outlet of the condenser, dehydrating the gas mixture to remove residual traces of water, catalytically converting the gas mixture to produce sulphuric anhydride, the entrant and discharge gases from the converter being brought into heat exchange relation, and absorbing the sulphuric anhydride.

16. In the manufacture of sulphuric acid by the contact process, the method which includes burning highly concentrated H2S gas in a limited air supply just sufficient for the primary oxidation of the hydrogen and sulphur in the H2S gas, the lack of excess air resulting in a high combustion temperature and both of these factors contributing to the absence of SO3 while producing the desired SO2 gas, exposing the moisture laden SO2 gas to a direct water spray in order to condense and remove the moisture content in the combustion gas, the condensing water being kept within temperature limits intended, on the one hand, to prevent vaporization of water, and, on the other hand, to prevent appreciable absorption of SO2 in the water, adding air to the SO2 gas immediately adjacent the outlet of the condenser, dehydrating the gas mixture to remove residual traces of water, catalytically converting the gas mixture to produce sulphuric anhydride, the entrant and discharge gases from the converter being brought into heat exchange relation, and absorbing the sulphuric anhydride in circulating sulphuric acid until the acid is brought up to desired strength.

INGENUIN HECHENBLEIKNER.
THOMAS C. OLIVER.
SAMUEL F. SPANGLER.